(12) United States Patent
Ishihara et al.

(10) Patent No.: US 10,016,815 B2
(45) Date of Patent: Jul. 10, 2018

(54) MACHINE TOOL AND MACHINING METHOD

(71) Applicant: MURATA MACHINERY, LTD., Kyoto-shi, Kyoto (JP)

(72) Inventors: Tadashi Ishihara, Inuyama (JP); Yasuhiro Matsukura, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 15/321,808

(22) PCT Filed: May 15, 2015

(86) PCT No.: PCT/JP2015/064002
§ 371 (c)(1),
(2) Date: Dec. 23, 2016

(87) PCT Pub. No.: WO2015/198740
PCT Pub. Date: Dec. 30, 2015

(65) Prior Publication Data
US 2017/0129018 A1 May 11, 2017

(30) Foreign Application Priority Data

Jun. 27, 2014 (JP) .................................. 2014-132471

(51) Int. Cl.
*B23B 7/00* (2006.01)
*B23B 29/32* (2006.01)
(Continued)

(52) U.S. Cl.
CPC .............. *B23B 29/323* (2013.01); *B23B 3/06* (2013.01); *B23B 29/04* (2013.01)

(58) Field of Classification Search
CPC ........... B23B 1/00; B23B 27/16; B23B 29/04; B23B 3/06; B23B 3/16; B23B 3/26;
(Continued)

(56) References Cited

U.S. PATENT DOCUMENTS 3,484,919 A * 12/1969 Stier .................... B23B 27/1622
407/103
4,636,117 A * 1/1987 Shikata ............... B23B 27/1622
407/104
(Continued)

FOREIGN PATENT DOCUMENTS

JP 06-206145 A 7/1994

OTHER PUBLICATIONS

Official Communication issued in corresponding European Patent Application No. 15811868.7, dated Jan. 25, 2018.

*Primary Examiner* — Sara Addisu
(74) *Attorney, Agent, or Firm* — Keating & Bennett, LLP

(57) ABSTRACT

A machine tool includes a main spindle that rotates while holding a workpiece, a mover that moves a cutting tool including a linear cutting blade that cuts the workpiece, with respect to the workpiece in a moving direction including at least a Z-direction parallel or substantially parallel with the axis of the main spindle and a Y-direction perpendicular or substantially perpendicular to both the Z-direction and an X-direction determining the amount of cutting of the workpiece, a holder that holds the cutting tool in a state in which the direction of the linear cutting blade is inclined with respect to the Z-direction by a predetermined angle when seen from the X-direction, and an angle adjuster that changes the edge angle.

7 Claims, 9 Drawing Sheets

(51) Int. Cl.
  *B23B 29/04* (2006.01)
  *B23B 3/06* (2006.01)
(58) Field of Classification Search
  CPC ........... B23B 3/162; B23B 3/161; B23B 7/04;
       B23B 7/06; B23B 29/246; B23B 29/326;
                                B23B 29/323
  See application file for complete search history.

(56) References Cited

U.S. PATENT DOCUMENTS

| | | | | |
|---|---|---|---|---|
| 5,218,893 | A * | 6/1993 | Shikata | B23B 1/00 |
| | | | | 82/1.11 |
| 5,778,745 | A * | 7/1998 | Furusawa | B23B 25/02 |
| | | | | 451/28 |
| 6,708,382 | B2 * | 3/2004 | Yamazaki | B23B 27/1662 |
| | | | | 29/27 C |
| 6,952,987 | B2 * | 10/2005 | Schreiber | B23B 1/00 |
| | | | | 82/1.11 |
| 7,021,182 | B2 * | 4/2006 | Edler | B23B 29/242 |
| | | | | 407/99 |
| 7,216,571 | B2 * | 5/2007 | Schreiber | B23B 1/00 |
| | | | | 407/69 |
| 7,739,931 | B2 * | 6/2010 | van Asten | B23B 27/145 |
| | | | | 407/113 |
| 2002/0029661 | A1 | 3/2002 | Yamazaki et al. | |
| 2003/0089204 | A1 | 5/2003 | Schreiber et al. | |
| 2005/0160887 | A1 * | 7/2005 | Erickson | B23B 1/00 |
| | | | | 82/121 |
| 2008/0253847 | A1 | 10/2008 | Nicholas | |
| 2016/0288214 | A1 * | 10/2016 | Ishihara | B23B 5/36 |

* cited by examiner

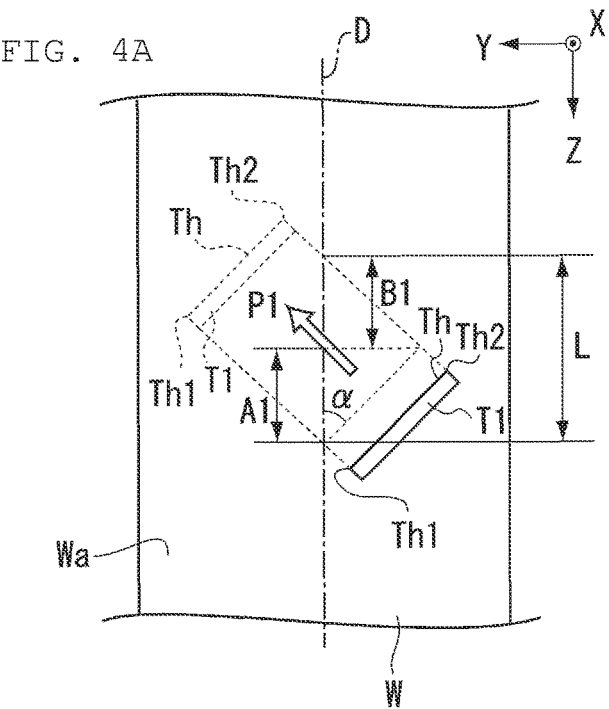
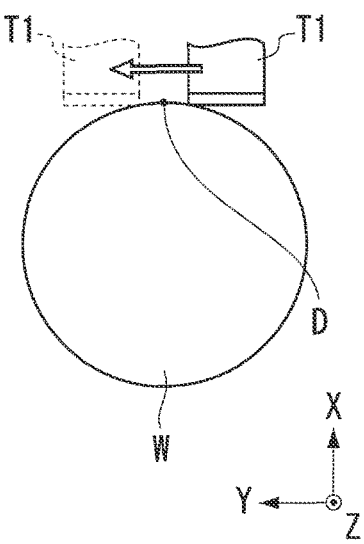
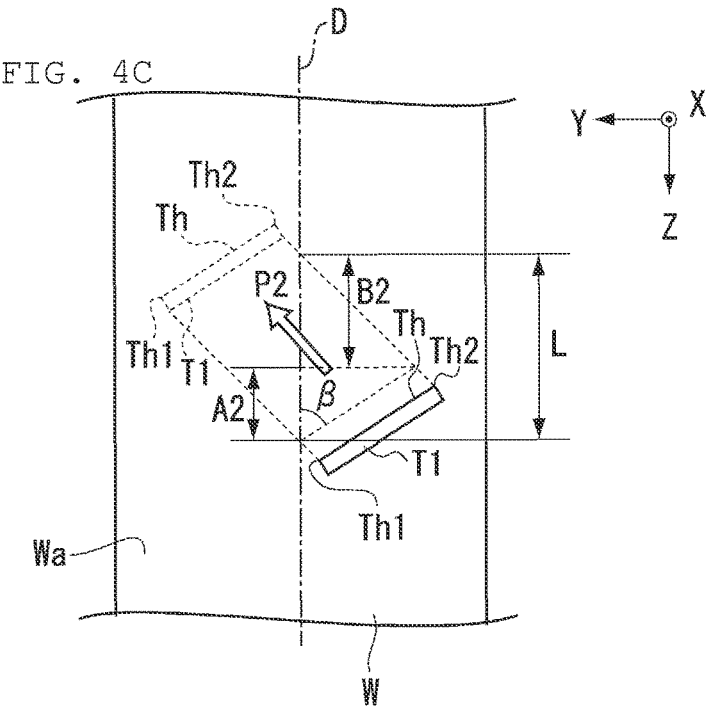

MACHINE TOOL AND MACHINING METHOD

BACKGROUND OF THE INVENTION

1. Field of the Invention

The present invention relates to a machine tool that cuts a workpiece and a machining method.

2. Description of the Related Art

A lathe, which is a machine tool, holds a workpiece to be machined, on a rotating shaft (spindle) and performs cutting or the like on the workpiece using a cutting tool while rotating the workpiece. As a machining method using a lathe, for example, there is known a machining method of cutting a workpiece while feeding a cutting tool in a tangential direction of the workpiece (a direction crossing the rotation axis (see Japanese Patent No. 3984052).

In this machining method, the edge of the cutting tool is positioned so as to be inclined with respect to the direction of a generating line of the cut portion of the workpiece by a predetermined angle. As the predetermined angle is reduced, the edge of the cutting tool comes closer to a state in which the edge is along the generating line of the workpiece. Accordingly, the cutting range in the direction of the generating line is widened, resulting in a reduction in the machining time. However, if a small-diameter workpiece, for example, is cut over a wide range thereof, the load on the workpiece (the cutting force applied to the workpiece) is increased. Thus, chattering vibration, bending, or the like may occur in the workpiece. For this reason, it is necessary to adjust the direction of the edge (edge angle) to reduce the load on the workpiece. A conventional machine tool is provided with multiple types of cutting tools or holders having different edge angles with respect to a generating line of a workpiece, and the operator replaces the cutting tool or holder with another to change the direction of the edge.

However, the method of replacing the cutting tool or holder has a problem that the operator has to do troublesome work such as demounting and mounting of the cutting tool or the like and this work takes time.

SUMMARY OF THE INVENTION

In view of the foregoing, preferred embodiments of the present invention provide a machine tool and a machining method that are able to easily change a direction of an edge of a cutting tool in a short time.

A machine tool according to a preferred embodiment of the present invention includes a main spindle that rotates while holding a workpiece, a mover that moves a cutting tool with respect to the workpiece in a moving direction including at least a Z-direction parallel or substantially parallel with an axis of the main spindle and a Y-direction perpendicular or substantially perpendicular to both the Z-direction and an X-direction, the X-direction being perpendicular or substantially perpendicular to the Z-direction and determining the amount of cutting of the workpiece, the cutting tool including a linear cutting blade that cuts the workpiece, a holder that holds the cutting tool in a state in which a direction of the linear cutting blade is inclined with respect to the Z-direction by a predetermined angle when seen from the X-direction, and an angle adjuster that changes the predetermined angle.

The moving direction may be a direction obtained by combining the Z-direction and the Y-direction. The angle adjuster may include a rotor that is able to rotate about an axis parallel or substantially parallel with the X-direction, and the holder may be mounted on the rotor. The rotor may be integral with the holder. The machine tool may further include a driver that rotates the rotor. The rotor and a support that supports the rotor may be provided with marks indicating the predetermined angle. The machine tool may further include a controller that controls movement of the mover on the basis of information about the predetermined angle and the workpiece.

A machining method according to a preferred embodiment of the present invention is a method for machining a workpiece rotating while being held by a main spindle. The method includes moving a cutting tool with respect to the workpiece in a moving direction including at least a Z-direction parallel or substantially parallel with an axis of the main spindle and a Y-direction perpendicular or substantially perpendicular to both the Z-direction and an X-direction, the X-direction being perpendicular or substantially perpendicular to the Z-direction and determining the amount of cutting of the workpiece, the cutting tool including a linear cutting blade that cuts the workpiece, holding the cutting tool in a state in which a direction of the linear cutting blade is inclined with respect to the Z-direction by a predetermined angle when seen from the X-direction, and changing the predetermined angle.

According to various preferred embodiments of the present invention, a cutting tool is held by the holder in a state in which the direction of the linear cutting blade is inclined with respect to the Z direction by the predetermined angle when seen from the X-direction, and the operator is able to change the predetermined angle using the angle adjuster. Thus, the operator is able to adjust the predetermined angle without having to replace the cutting tool or holder. As a result, the operator is able to easily change the direction of the edge of the cutting tool in a short time.

If the moving direction is a direction obtained by combining the Z direction and the Y direction, it is possible to cut a wide range of the workpiece in the Z direction by feeding the cutting tool in the combined direction and thus to reduce the machining time. If the angle adjuster includes the rotor that is able to rotate about the axis parallel or substantially parallel with the X-direction and if the holder is mounted on the rotor, the operator is able to rotate the cutting tool along with the holder by rotating the rotor. Thus, the operator is able to easily adjust the predetermined angle. If the rotor is integral with the holder, the length to the edge (overhang) is able to be reduced. If the machine tool further includes the driver that rotates the rotor, the predetermined angle is able to be automatically adjusted on the basis of the drive of the driver. If the rotor and the support that supports the rotor are provided with the marks indicating the predetermined angle, the operator is able to adjust the rotation of the rotor using the marks and thus is able to easily adjust the predetermined angle. If the machine tool further includes the controller that controls the movement of the mover on the basis of information about the predetermined angle and workpiece, it is possible to perform optimum machining such that the machining accuracy is improved without reducing the machining efficiency.

According to a machining method of a preferred embodiment of the present invention, the cutting tool is held such that the direction of the linear cutting blade is inclined with respect to the Z direction by the predetermined angle when seen from the X-direction, and the operator is able to change the predetermined angle. Thus, the operator is able to easily change the direction of the edge of the cutting tool in a short time in accordance with the machining condition of the workpiece and to accurately machine the workpiece.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4A-4C are diagrams showing an example of operations of a cutting tool, in which FIG. 4A is a diagram of the workpiece seen from the X-direction; FIG. 4B is a diagram of the workpiece seen from the Z direction; and FIG. 4C is a diagram of the workpiece seen from the X-direction in a case in which the edge angle is different.

FIGS. 7A and 7B are diagrams showing an example of a tool head according to a modification of a preferred embodiment of the present invention, in which FIG. 7A is a perspective view; and FIG. 7B is a diagram of the tool head seen from a direction Q in FIG. 7A.

FIGS. 9A and 9B are diagrams showing another example of the operation of a cutting tool, in which FIG. 9A is a diagram of a workpiece seen from the X-direction; and FIG. 9B is a diagram of the workpiece seen from the X-direction in a case in which the edge angle is different.

DETAILED DESCRIPTION OF THE PREFERRED EMBODIMENTS

Figure 1A:
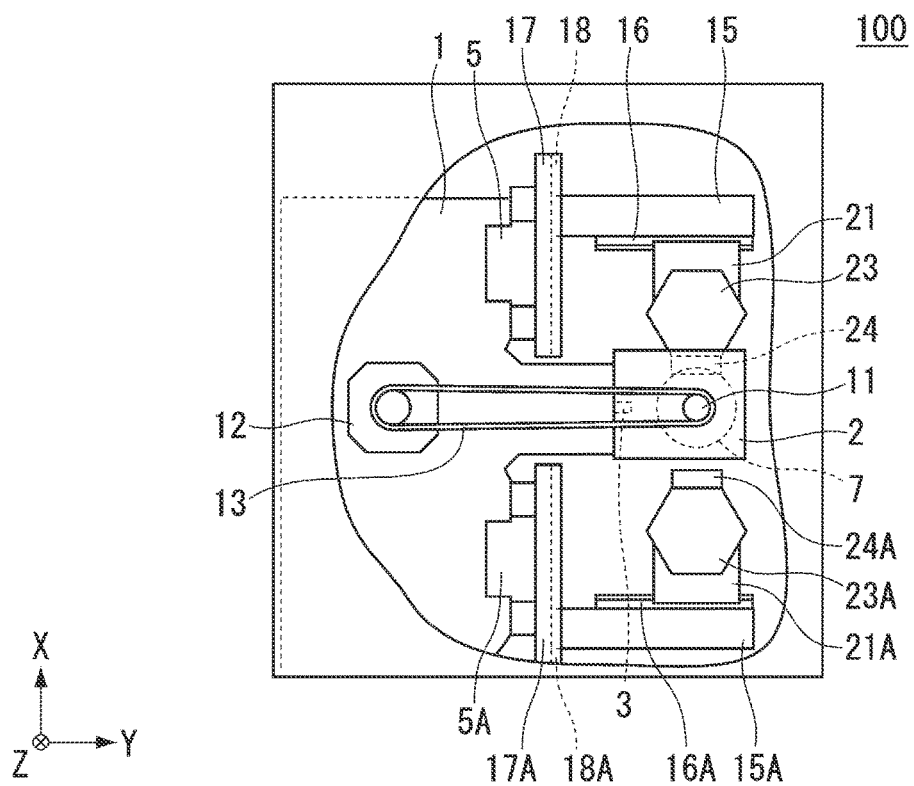
FIGS. 1A and 1B are diagrams showing examples of a machine tool according to a first preferred embodiment of the present invention.

Now, preferred embodiments of the present invention will be described with reference to the drawings. However, the present invention is not limited thereto. To clarify the preferred embodiments of the present invention, the drawings are scaled, for example, partially enlarged or highlighted, as necessary. In the drawings, directions are shown by an XYZ coordinate system. In the XYZ coordinate system, a plane parallel or substantially parallel with the horizontal plane is defined as a YZ plane; the direction of the rotation axis of a main spindle 7 (a counter spindle 8) in the YZ plane is defined as a Z-direction; the direction perpendicular or substantially perpendicular to the Z-direction is defined as a Y-direction; the direction perpendicular or substantially perpendicular to the YZ plane is defined as an X-direction; and the X-axis represents a direction that is perpendicular or substantially perpendicular to the Z-direction and that determines the amount of cutting of a workpiece. In the drawings, directions shown by arrows are the positive directions of the X-, Y-, and Z-directions, and opposite directions are the negative directions thereof. Other preferred embodiments of the present invention also provide methods for machining a workpiece rotating while being held by a main spindle. A method according to a preferred embodiment of the present invention includes moving a cutting tool with respect to the workpiece in a moving direction including at least a Z-direction parallel or substantially parallel with an axis of the main spindle and a Y-direction perpendicular or substantially perpendicular to both the Z-direction and an X-direction, the X-direction being perpendicular or substantially perpendicular to the Z-direction and determining the amount of cutting of the workpiece, the cutting tool including a linear cutting blade that cuts the workpiece, holding the cutting tool in a state in which a direction of the linear cutting blade is inclined with respect to the Z-direction by a predetermined angle when seen from the X-direction, and changing the predetermined angle.

First Preferred Embodiment

Figure 1B:
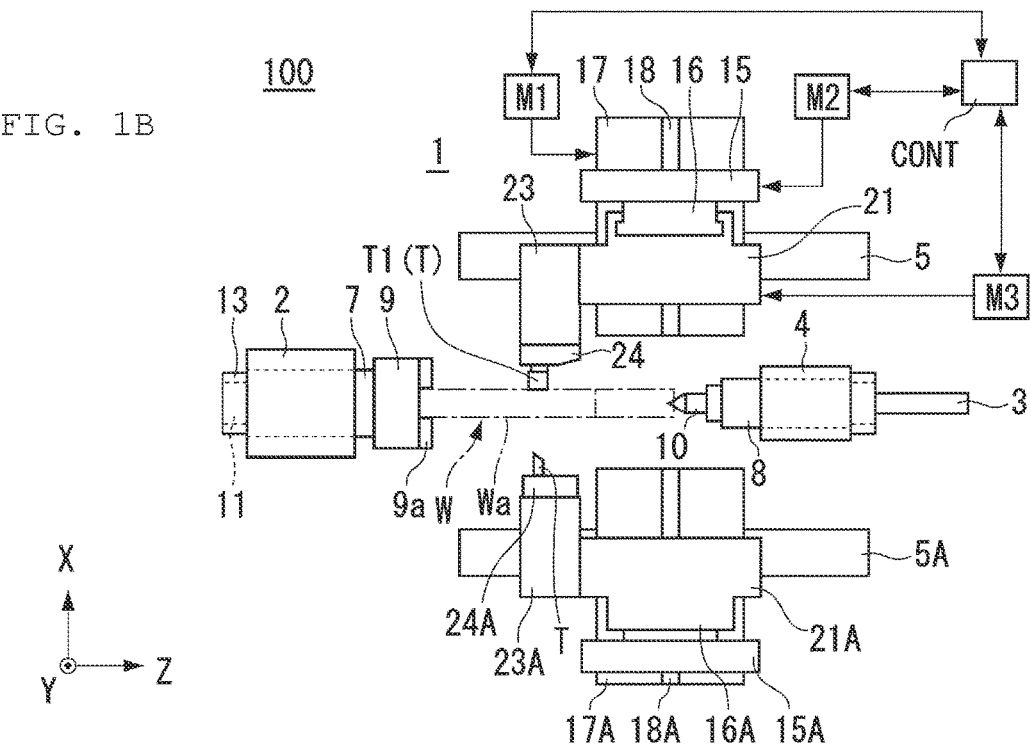

A machine tool 100 according to a first preferred embodiment of the present invention will be described with reference to the drawings. FIGS. 1A and 1B are diagrams showing an example of a machine tool 100 of the first preferred embodiment of the present invention, in which FIG. 1A is a side view; and FIG. 1B is a front view. The machine tool 100 shown in FIGS. 1A and 1B is a lathe. In FIGS. 1A and 1B, the front side of the machine tool 100 is located on the positive Y-side, and the back side thereof is located on the negative Y-side. The lateral sides of the machine tool 100 are located on the positive and negative Z-sides, and the Z-direction represents the horizontal direction of the machine tool 100.

As shown in FIGS. 1A and 1B, the machine tool 100 includes a base 1. The base 1 is provided with a headstock 2 and a tailstock 4. The headstock 2 rotatably supports a main spindle 7 through a bearing or the like (not shown). While the headstock 2 is fixed to the base 1, it may be movable in the Z, X, Y, or other directions by driving a motor or the like. The main spindle 7 includes a chuck driver 9 on the positive Z-side end thereof. The chuck driver 9 causes multiple grasping claws 9a to move in the radial direction of the main spindle 7 and to hold a workpiece W. While, in FIGS. 1A and 1B, the workpiece W is grasped using three grasping claws 9a equally spaced around the rotation axis of the main spindle 7, other configurations may be used. The grasping claws 9a may be in any number or shape as long as they are able to hold the workpiece W. The workpiece W grasped by the grasping claws 9a preferably includes a cylindrical surface Wa (e.g., a cylindrical shape).

The negative Z-side end of the main spindle 7 protrudes from the headstock 2 in the negative Z-direction and includes a pulley 11 mounted thereon. A belt 13 extends between the pulley 11 and the rotating shaft of a motor 12 disposed in the base 1. Thus, the main spindle 7 is rotationally driven by the motor 12 through the belt 13. The rev or the like of the motor 12 is controlled in accordance with an instruction from a controller (not shown). The motor 12 is, for example, a motor including a torque controller. The main spindle 7 need not be driven by the motor 12 or belt 13; the drive of the motor 12 may be transmitted to the main spindle 7 through a gear train or the like, or the motor 12 may directly rotate the main spindle 7.

The tailstock 4 is preferably movable along a Z-direction guide 3 disposed on the base 1. The tailstock 4 rotatably supports the counter spindle 8 through a bearing or the like (not shown). The directions of the rotation axes of the main spindle 7 and counter spindle 8 are both the Z-direction. The tailstock 4 includes a center 10 mounted on the negative Z-side end thereof. The counter spindle 8 may be fixed to the tailstock 4 and used as a dead center.

As shown by a dot-and-dash line in FIG. 1B, if the workpiece W has a long length (is long in the Z-direction), the positive Z-side end of the workpiece W is held by the center 10 of the tailstock 4. Thus, the long workpiece is rotated while being sandwiched between the main spindle 7 and counter spindle 8. As a result, the workpiece W is able to be rotated stably during cutting. If the workpiece W has a short length (is short in the Z-direction), it is rotated while being held by only the grasping claws 9a of the main spindle 7. In this case, the tailstock 4 need not be used.

As shown in FIGS. 1A and 1B, a Z-direction guide 5 is disposed on the base 1 in the Z-direction. A Z-direction guide 5A similar to the Z-direction guide 5 is disposed in a negative X position of the Z-direction guide 5 in the Z-direction. The Z direction guides 5 and 5A are provided with Z-axis slides 17 and 17A, respectively, that are able to move along the Z-direction guides 5 and 5A in the Z-direction. As shown in FIG. 1B, the Z-axis slide 17 is moved in the Z-direction by the drive of a Z-direction drive system (mover) M1 and held in position. The Z direction drive system M1 is, for example, an electric motor or hydraulic system. The Z-axis slide 17A is provided with a drive system similar to the Z-direction drive system M1, and is moved in the Z-direction by the drive of this drive system and held in position. The configuration of the drive system of the Z-axis slide 17A may be the same as or different from that of the Z-direction drive system M1.

The Z-axis slides 17 and 17A have X-direction guides 18 and 18A, respectively, thereon. The Z-axis slides 17 and 17A are also provided with X-axis slides 15 and 15A, respectively, that are able to be moved along the X-direction guides 18 and 18A. The X-axis slide 15 is moved in the X-direction by the drive of an X-direction drive system (mover) M2 and held in position. The X-direction drive system M2 is, for example, an electric motor or hydraulic system. The X-axis slide 15A is provided with a drive system similar to the X-direction drive system M2, and is moved in the X-direction by the drive of this drive system and held in position. The configuration of the drive system of the X-axis slide 15A may be the same as or different from that of the X-direction drive system M2.

The X-axis slides 15 and 15A include Y-direction guides 16 and 16A, respectively, thereon. The X-axis slides 15 and 15A are also provided with tool post drivers 21 and 21A, respectively, that are able to be moved along the Y-direction guides 16 and 16A. The tool post driver 21 is moved in the Y-direction by the drive of a Y-direction drive system (mover) M3 and held in position. The Y-direction drive system M3 is, for example, an electric motor or hydraulic system. The tool post driver 21A is provided with a drive system similar to the Y-direction drive system M3, and is moved in the Y-direction by the drive of this drive system and held in position. The configuration of the drive system of the tool post driver 21A may be the same as or different from that of the Y-direction drive system M3. The Z-direction drive system M1, X-direction drive system M2, and Y-direction drive system M3 are controlled by a controller CONT.

The tool post drivers 21 and 21A include rotational drivers, such as motors. The tool post driver 21 includes a first turret 23 mounted thereon. The first turret 23 is able to be rotated using the Z-direction as the axis by the drive of the rotational driver. Similarly, the tool post driver 21A includes a second turret 23A mounted thereon. The second turret 23A is able to be rotated using the Z-direction as the axis by the drive of the rotational driver. The first turret 23 is positioned over the workpiece W (on the positive X-side thereof); the second turret 23A is positioned under the workpiece W (on the negative X-side thereof). That is, the first and second turrets 23 and 23A are positioned so as to sandwich the workpiece W.

The first and second turrets 23 and 23A include, on the circumferential surfaces thereof, multiple holders that hold cutting tools T. The cutting tools T are held in all or some of the holders. Accordingly, a desired cutting tool T is selected by rotating the first turret 23 or second turret 23A. The cutting tools T held in the holders of the first and second turrets 23 and 23A are able to be replaced on a holder basis. The cutting tools T include cutting tools to cut the workpiece W, as well as rotary tools, such as a drill and an end mill.

The first turret 23 includes a tool head 24 defining and functioning as one of the holders thereon, and the second turret 23A includes a tool head 24A defining and functioning as one of the holders thereon. The configurations of the tool heads 24 and 24A may be the same or different. Note that the second turret 23A need not be provided with the tool head 24A.

A cutting tool T1 is mounted over the tool head 24 with a holder 25 (see FIG. 2) therebetween. On the other hand, a cutting tool T is mounted over the tool head 24A with a holder (not shown) therebetween. The cutting tool T may be the same as or different from the cutting tool T1 mounted over the tool head 24.

While, in the machine tool 100 shown in FIGS. 1A and 1B, the cutting tools T and T1 are positioned on the positive-X and negative X-sides of the workpiece W so as to sandwich the workpiece W, a cutting tool may be positioned on either side. Also, while the cutting tools T and T1 are positioned in the X-direction of the workpiece W (the vertical direction), these cutting tools may be located in the Y-direction of the workpiece W. Also, when cutting the workpiece W, the cutting tools T and T1 may be used in any manner under the control of a controller (not shown). For example, one of the cutting tools may be used, or both may be used alternately or simultaneously.

While, in FIGS. 1A and 1B, the first and second turrets 23 and 23A are used as tool rests, other types of tool rests may be used. For example, comb-shaped tool posts may be used. If comb-shaped tool posts are used, cutting tools T are held on the teeth of each comb-shaped tool post, and one of the cutting tools T is selected by moving the comb-shaped tool post in the direction in which the teeth are arranged.

Figure 2:
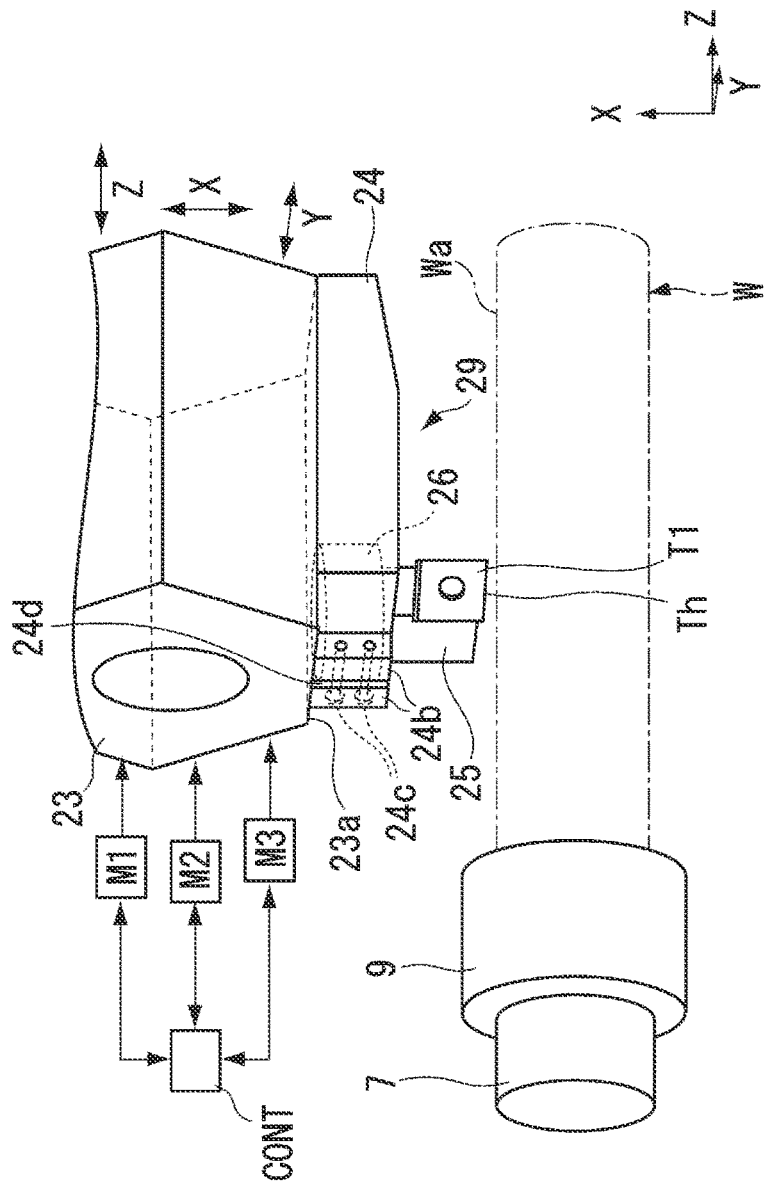
FIG. 2 is an enlarged perspective view showing an example of a workpiece.

FIG. 2 is an enlarged perspective view of the main spindle 7 and first turret 23, which corresponds to the workpiece W. As shown in FIG. 2, the tool head 24 is detachably mounted on the negative X-side surface 23a of the first turret 23. A holder 25 is mounted over the negative X-side of the tool head 24 with a rotor 26 (to be discussed later) therebetween. The holder 25 holds the cutting tool T1. The cutting tool T1 is set so that a linear cutting blade Th thereof is along the YZ plane.

The cutting tool T1 is positioned in the X-direction by driving the X-direction drive system M2. Thus, the amount of cutting of the workpiece W is determined. Also, by driving the Z-direction drive system M1, X-direction drive system M2, and Y-direction drive system M3, the cutting tool T1 is able to be moved relative to the workpiece W along with the first turret 23 and tool head 24 in one of the Z-, X-, and Y-directions or in a direction obtained by combining two or more of these directions.

Figure 3A:
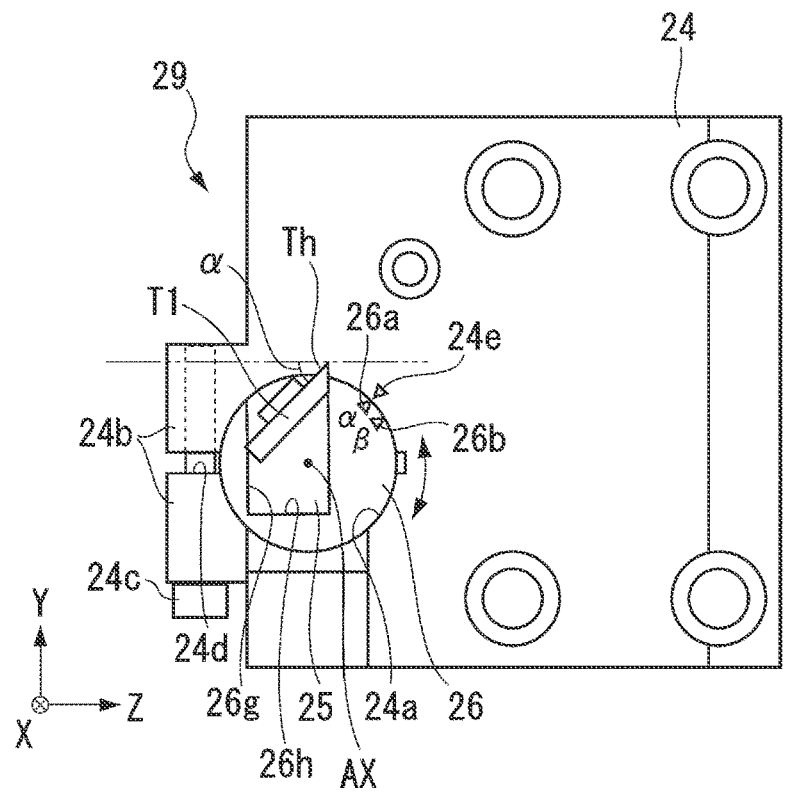
FIGS. 3A and 3B are diagrams showing examples of a tool head.
Figure 3B:
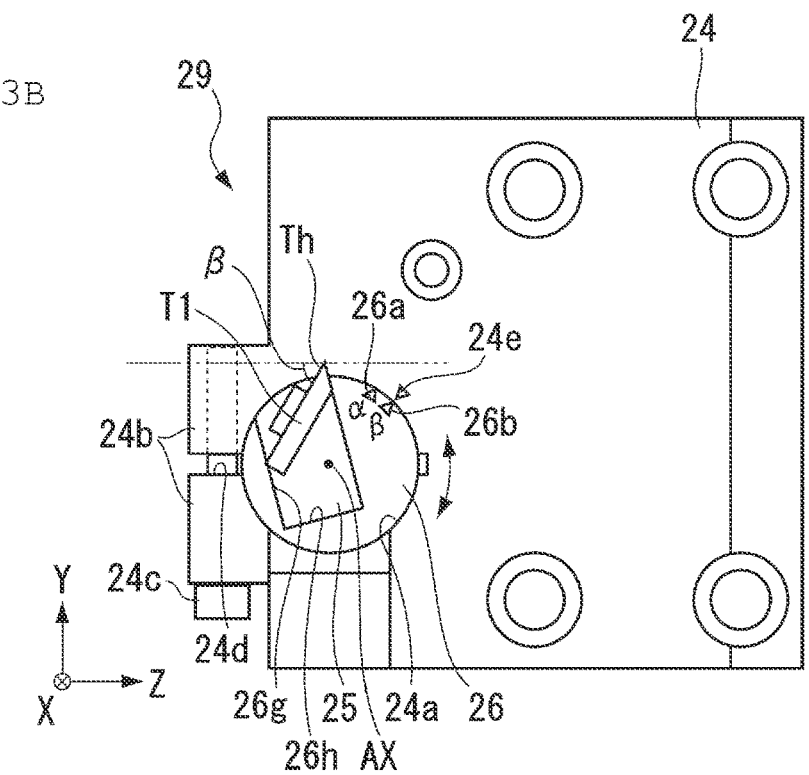

FIGS. 3A and 3B are diagrams showing the negative X-side configuration of the tool head 24.

As shown in FIGS. 3A and 3B, the tool head 24 includes a cylindrical opening 24a on the negative X-side thereof, and the rotor 26 (to be discussed later) is inserted in the opening 24a of the tool head 24.

The tool head 24 also has a protrusion 24b on the negative Z-side end surface thereof. The protrusion 24b protrudes in the negative Z-direction and includes a slit 24d. The slit 24d linearly extends from the front end of the protrusion 24b in the negative Z-direction. The slit 24d cuts across the protrusion 24b, which leads to the opening 24a, as well as extends to a portion on the positive Z-side of the opening 24a, and the protrusion 24b is divided into two portions. In the present preferred embodiment, for example, the tool head 24 is elastically deformable so that the opening 24a is narrowed when a force is applied in the direction in which the divided portions of the protrusion 24b come close to each other (e.g., in the Y-direction). The divided portions of the protrusion 24b are fastened by bolts 24c, for example. By tightening the bolts 24c, a force is applied so that the divided portions of the protrusion 24b come close to each other in the Y-direction. Thus, the inner wall of the opening 24a fastens the rotor 26. Also, by loosening the bolts 24c, the force applied to the divided portions of the protrusion 24b is released, thus loosening the fastened rotor 26. In this case, the rotor 26 is allowed to rotate about a rotation axis AX parallel or substantially parallel with the X-direction.

The rotor 26 preferably has a cylindrical shape, for example. It is inserted in the opening 24a, as well as supported by the tool head 24. As seen above, the tool head 24 is a support member that supports the rotor 26. The rotor 26 includes thereon a guide 26g to insert the holder 25.

The guide 26g preferably has a straight line shape, for example. The guide 26g includes a holder contact surface 26h on the end thereof in the length direction (i.e., on the negative Y-side end in FIG. 3A). When the holder 25 contacts the holder contact surface 26h, the holder 25 is positioned. The holder contact surface 26h defines and functions as a surface that receives the cutting force of the cutting tool T1. The size (width) of the guide 26g in the short direction is set in accordance with the size of the holder 25. The holder 25 is fixed to the rotor 26 by a fixing member (not shown). By fixing the holder 25 to the guide 26g, the direction of the linear cutting blade Th of the cutting tool T1 with respect to the rotor 26 is fixed to one direction. By rotating the rotor 26 about the rotation axis AX in this state, the holder 25 and cutting tool T1 are rotated integrally with the rotor 26, thus changing the direction of the linear cutting blade Th.

The rotor 26 includes marks 26a and 26b on the negative X-side end surface thereof. The marks 26a and 26b are preferably isosceles triangles, and the peaks thereof are oriented to, for example, the outer circumference of the rotor 26. The tool head 24 includes a mark 24e on the negative X-side surface thereof. The mark 26e preferably is an isosceles triangle, and the peak thereof is oriented to, for example, the rotor 26. The mark 26e is disposed such that when rotating the rotor 26 about the rotation axis AX, the peak of the mark 26a or 26b corresponds to the peak of the mark 24e on the tool head 24. The marks 26a and 26b may be scale divisions or the like.

For example, with the holder 25 inserted in the rotor 26, the mark 26a indicates the rotation position of the rotor 26 such that the linear cutting blade Th is inclined with respect to the Z-direction by an angle α (e.g., about 45°) when seen from the X-direction. Hereafter, the angle (predetermined angle) by which the linear cutting blade Th is inclined with respect to the Z-direction when seen from the X-direction X will be referred to as the "edge angle." FIG. 3A shows a state in which the mark 26a and mark 24e correspond to each other. As shown in FIG. 3A, by adjusting the rotation position of the rotor 26 so that the peaks of the mark 26a and mark 24e correspond to each other, the edge angle is able to be set to α.

The mark 26b indicates the rotation position of the rotor 26 such that the edge angle is β (e.g., about 60°). FIG. 3B shows a state in which the mark 26b and mark 24e correspond to each other. As shown in FIG. 3B, by adjusting the rotation position of the rotor 26 so that the peaks of the mark 26b and mark 24e correspond to each other, the edge angle is able to be set to β. A mark corresponding to an edge angle different from α and β may be additionally provided.

The operator is able to change the edge angle to a predetermined angle (e.g., angle α, angle β) by rotating the rotor 26 about the rotation axis AX with the bolts 24c loosened so that the mark 26a, mark 26b, or the like and the mark 24e correspond to each other. Thus, the operator is able to efficiently change the direction of the linear cutting blade Th to a predetermined direction. As seen above, the rotor 26 and the tool head 24 supporting the rotor 26 are disposed as an angle adjuster 29 that is able to change the edge angle.

Next, the operation of the machine tool 100 thus configured will be described. First, the operator causes the main spindle 7 to hold the workpiece W to be machined. After the workpiece W is grasped, the operator rotates the workpiece W by driving the motor 12 and thus rotating the main spindle 7. Note that when grasping the workpiece W using both the main spindle 7 and counter spindle 8, the operator rotates the main spindle 7 and counter spindle 8 synchronously. The rev of the workpiece W is set in accordance with the machining process as appropriate.

Then, the operator selects the cutting tool T1 by rotating the first turret 23. Note that before selecting the cutting tool T1, the operator inserts the rotor 26 into the opening 24a in the tool head 24 of the first turret 23. The operator then inserts the cutting tool T1 into the holder 25 and inserts the holder 25 into the rotor 26 (guide 26g) of the tool head 24. The holder 25 is fixed to the rotor 26 by a bolt or the like (not shown). Thus, the linear cutting blade Th is disposed in a direction parallel or substantially parallel with the YZ plane and so as to be inclined with respect to the Z-direction by a predetermined angle when seen from the X-direction. The operator then changes the edge angle by rotating the rotor 26. At this time, the operator is able to easily set the edge angle by causing the mark 26a, 26b, or the like provided on the rotor 26 and the mark 24e provided on the tool head 24 to correspond to each other.

The operator then adjusts the position of the cutting tool T1 in the X-direction. In this adjustment, the tool post driver 21 is moved in the X-direction by the X-direction drive system M2 so that the linear cutting blade Th of the cutting tool T1 corresponds to the cylindrical surface Wa of the workpiece W. The position of the linear cutting blade Th in the X-direction determines the amount of cutting of the cylindrical surface Wa of the workpiece W. The amount of cutting may be set to a predetermined value by the controller CONT, or may be set by the operator manually.

When the rotation of the workpiece W is stabilized, the operator cuts the cylindrical surface Wa of the workpiece W using the cutting tool T1. In the cutting process, the XYZ coordinate position to which the linear cutting blade Th of the cutting tool T1 is moved is set, for example, by the movement of the Z-axis slide 17 in the Z-direction and the movement of the tool head 24 in the Y-direction. These movements are made on the basis of the drive of the Z-direction drive system M1 and Y-direction drive system M3 under the control of the controller CONT.

When the rotor 26 is rotated about the rotation axis AX, the posture of the cutting tool T1 is changed. That is, the rotation of the rotor 26 changes the position of the edge of the linear cutting blade Th in the Y and Z-directions. The change in the position of the linear cutting blade Th vary with the shape or size of the cutting tool T1 (linear cutting blade Th), the rotation position of the rotor 26, or the like. For this reason, the operator may obtain a change in the position of the linear cutting blade Th caused by the rotation of the rotor 26 by an experiment, simulation, or the like in advance and then obtain the position of the linear cutting blade Th for each of cutting tools T1 to be used or for each of the rotation positions of the rotor 26. In this case, by correcting the drive of the Z-direction drive system M1 or Y-direction drive system M3, it is possible to avoid, for example, a shift in the cutting start position of the cutting tool T1, or the like.

In an example of the present preferred embodiment, the workpiece W is cut by moving the linear cutting blade Th of the cutting tool T1 in the Y-direction, which is a tangential direction of the cylindrical surface Wa of the workpiece W. This movement of the cutting tool T1 in the Y-direction is made on the basis of, for example, machining information (machining recipe) preset in a storage, memory or the like of the controller (not shown). Note that this movement of the cutting tool T1 may be made by the operator manually.

FIG. 4A shows the operation of the cutting tool T1 (linear cutting blade Th) on the workpiece W seen in the negative X-direction in a case in which the edge angle is set to a (e.g., about 45'). FIG. 4B shows the operation of the cutting tool T1 (linear cutting blade Th) seen form the Z-direction. FIG. 4C shows the operation of the cutting tool T1 (linear cutting blade Th) on the workpiece W seen in the negative X-direction in a case in which the edge angle is set to β (e.g., about 60°). In any of the cases shown in FIGS. 4A and 4C, when the linear cutting blade Th of the cutting tool T1 moves from the negative Y-side to the positive Y-side with respect to a generating line (axis) D in the Z-direction on the cylindrical surface Wa of the workpiece W, the positive Z-side of the linear cutting blade Th contacts the workpiece W first.

Next, the workpiece W is cut by moving the linear cutting blade Th in a direction (moving direction) P1 or P2 obtained by combining the positive Y-direction and negative Z-direction. As shown in FIGS. 4A to 4C, this moving direction is a track along a tangent plane to the cylindrical surface Wa of the workpiece W. First, a positive Z-side first end Th1 of the linear cutting blade Th contacts and cuts the cylindrical surface Wa. Then, the linear cutting blade Th moves along the cylindrical surface Wa in the positive Y-direction and the negative Z-direction (the direction P1 or P2). Thus, the cut portion of the workpiece W gradually shifts from the first end Th1 to a second end Th2 in the negative Z-direction. As seen above, the linear cutting blade Th moves in the direction P1 or P2, whereas the cut portion of the cylindrical surface Wa of the workpiece W moves in the Z-direction.

When the second end Th2 of the linear cutting blade Th leaves the generating line D, the cutting of the cylindrical surface Wa is complete. While the cylindrical surface Wa is cut using all the portions of the linear cutting blade Th from the first end Th1 to second end Th2, as seen above, the cylindrical surface Wa may be cut using some portions of the linear cutting blade Th.

In this cutting process, in a first case in which the edge angle is set to a small angle, for example, as shown in FIG. 4A (e.g., when the edge angle is set to α), the linear cutting blade Th comes close to the generating line D of the workpiece W compared to in a second case in which the edge angle is set to a large angle, for example, as shown in FIG. 4C (e.g., when the edge angle is set to β).

In the first case, as shown in FIG. 4A, the length L in the generating line D is cut by moving the linear cutting blade Th in the direction P1. The length L is the sum of a length A1 (cos α of the width of the linear cutting blade Th) obtained by projecting the linear cutting blade Th on the generating line D and a length B1 of the generating line D in the Z-direction that the linear cutting blade Th cuts while moving in the direction P1. In the second case, a length L is cut as well by moving the linear cutting blade Th in the direction P2. The length L here is the sum of a length A2 (cos β of the length of Th) obtained by projecting the linear cutting blade Th on the generating line D and a length B2 of the generating line D in the Z-direction that the linear cutting blade Th cuts while moving in the direction P2.

As shown in FIGS. 4A-4C, L=A1+B1, L=A2+B2, A1>A2, and B1<B2. Specifically, assuming that the same length L is cut and that the per-unit time feed of the cutting tool T1 is the same, the workpiece is able to be machined in a shorter time and higher surface accuracy (lower surface roughness) is obtained in the first case than in the second case. Machining the workpiece W in the second case in the same time as that in the first case requires increasing the feed and therefore reduces the surface accuracy (increases the surface roughness). For example, when a small-diameter workpiece or a low-rigidity workpiece is machined or when a portion distant from the grasping claws 9a, of the workpiece W (a portion having low grasping rigidity) is machined and when the edge angle is small as in the first case, the load on the workpiece W (the cutting force applied to the workpiece) is increased and thus chattering vibration, bending, or the like is more likely to occur in the workpiece W. In the second case, on the other hand, the edge angle is smaller than that in the first case and therefore if the same feed as that in the first case is set, the load on the workpiece W is reduced and thus chattering vibration, bending, or the like is less likely to occur in the workpiece W.

Accordingly, for example, when a large-diameter workpiece or a high-rigidity workpiece is machined or when a portion close to the grasping claws 9a, of the workpiece W (a portion having high grasping rigidity) is machined, the edge angle is set to a small angle (e.g., a). Thus, the cutting range of the linear cutting blade Th in the Z-direction is increased, allowing for a reduction in machining time and an improvement in surface accuracy.

On the other hand, when a small-diameter workpiece or a low-rigidity workpiece is machined or when a portion having low grasping rigidity, of the workpiece W is machined, the edge angle is set to a large angle (e.g., β) without changing the feed. Thus, the cutting range of the linear cutting blade Th in the Z-direction is reduced, thus reducing the load on the workpiece W and making chattering vibration, bending, or the like less likely to occur in the workpiece W.

As seen above, when setting (changing) the edge angle, the operator only has to rotate the rotor 26 so that the marks 26a and 26b correspond to the mark 24e, and thus is easily able to change the edge angle (the direction of the linear cutting blade Th).

While, in the present preferred embodiment, the cutting tool T1 of the first turret 23 preferably is used when cutting the workpiece W, the cutting tool T (see FIGS. 1A and 1B) of the second turret 23A may be additionally used. In this case, the cutting tool T of the second turret 23A may be caused to move on a track similar to that of the cutting tool T1 on the negative X-side of the workpiece W and to cut the cylindrical surface Wa. When cutting the cylindrical surface Wa using both the cutting tools T1 and T, the cutting tools may cut the same orbital portion of the cylindrical surface Wa in different amounts, or may cut different portions of the cylindrical surface Wa. When the cutting of the workpiece W is complete, the operator causes the grasping claws 9a to release the workpiece W and takes out the workpiece W.

As seen above, the machine tool 100 of the present preferred embodiment is able to change the edge angle using the angle adjuster 29 with the cutting tool T1 held by the holder 25 so that the direction of the linear cutting blade Th is inclined with respect to the Z-direction by a predetermined angle when seen from the X-direction. Thus, the operator is able to adjust the edge angle without having to replace the cutting tool T1 or holder 25. As a result, the operator is able to easily change the direction of the edge of the cutting tool T1 in a short time.

Second Preferred Embodiment

A machine tool 200 according to a second preferred embodiment of the present invention will be described.

Figure 5:
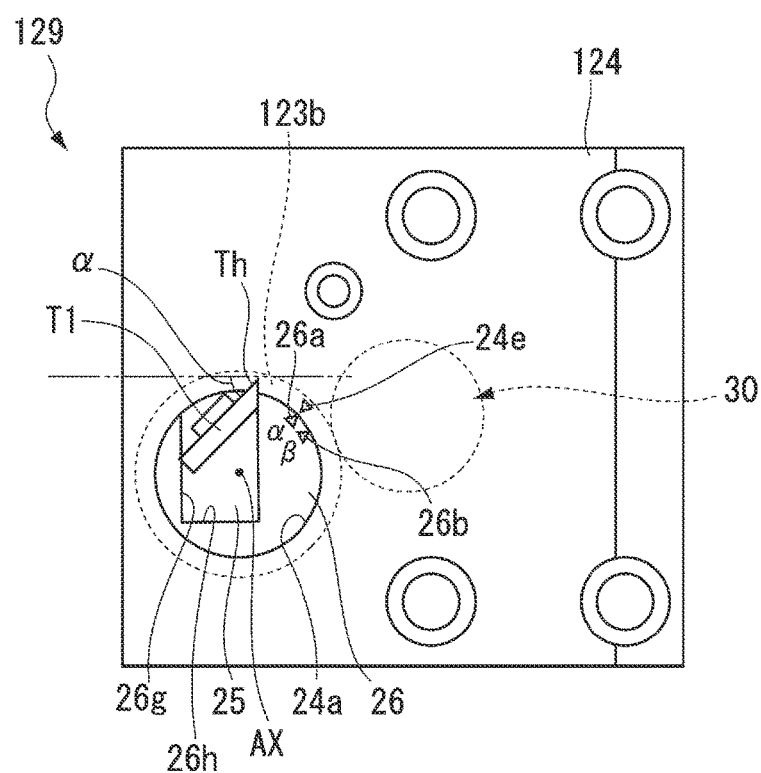
FIG. 5 is a diagram showing an example of a machine tool according to a second preferred embodiment of the present invention.

FIG. 5 shows an example of a tool head 124 of the machine tool 200 of the second preferred embodiment seen in the positive X-direction. Elements not shown in FIG. 5 are similar to those of the machine tool 100 shown in FIGS. 1A and 1B. Also, in FIG. 5, elements identical or equivalent to those in the first preferred embodiment are given the same reference signs, and the description thereof will be omitted or simplified. An angle adjuster 129 of the second preferred embodiment is configured differently from the angle adjuster of the first preferred embodiment (where the operator rotates the rotor 26). As shown in FIG. 5, the angle adjuster 129 includes the tool head 124, a rotor 26, and a driver 30. The driver 30 rotates the rotor 26. The driver 30 is controlled by, for example, a controller CONT.

Figure 6A:
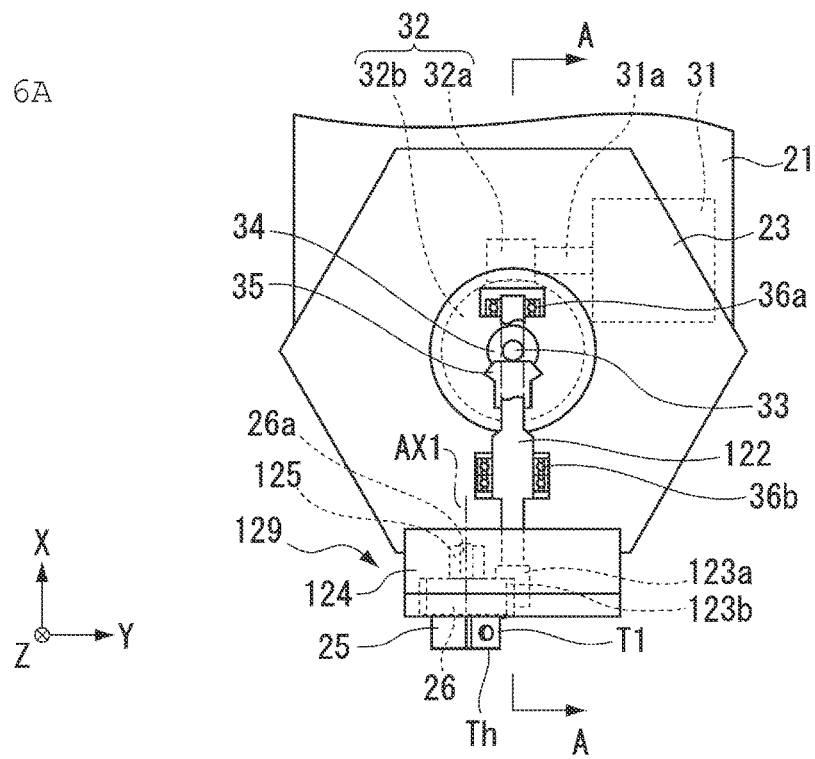
FIG. 6A is a diagram of the inside of a tool post seen in the positive Z-direction.
Figure 6B:
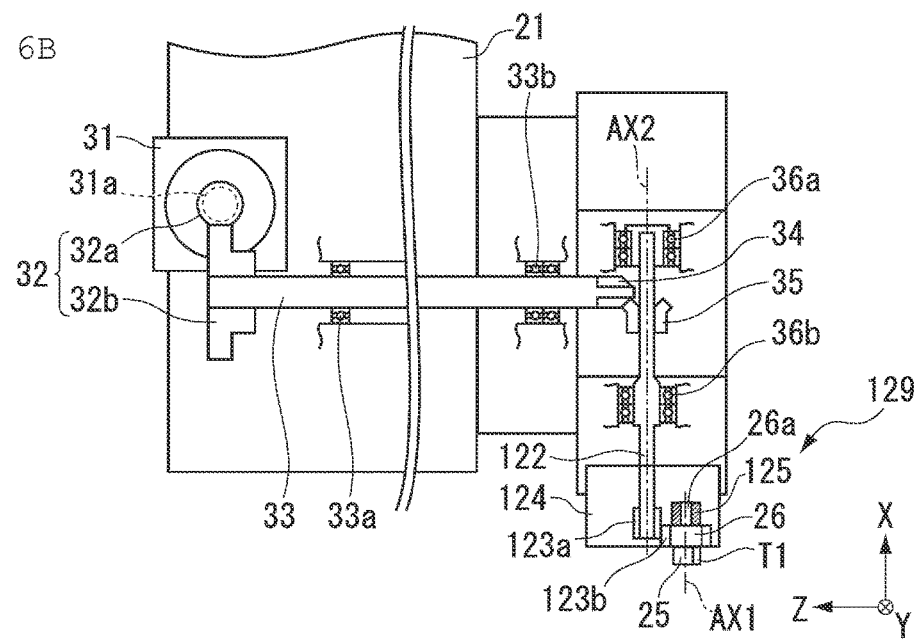
FIG. 6B is a sectional view taken along line A-A in FIG. 6A.

FIG. 6A is a diagram of the inside of a first turret 23 (a second turret 23A) seen in the positive Z-direction, and FIG. 6B is a sectional view taken along line A-A in FIG. 6A. As shown in FIGS. 6A and 6B, the driver 30 includes a motor 31, a worm gear 32, a transmission shaft 33, and bevel gears 34 and 35.

The motor 31 is disposed on the positive Z-side of the first turret 23 and is mounted on, for example, a tool post driver 21. The motor 31 includes an output shaft 31a parallel or substantially parallel with the Y-direction. The output shaft 31a is rotated about a rotation axis parallel or substantially parallel with the Y-direction. The worm gear 32 includes a screw gear 32a mounted on the output shaft 31a and a helical gear 32b mounted on a transmission shaft 33. The worm gear 32 transmits the rotation of the output shaft 31a to the transmission shaft 33.

The transmission shaft 33 is supported by, for example, bearings 33a and 33b such that it can be rotated about a rotation axis parallel or substantially parallel with the Z-direction. The transmission shaft 33 includes the helical gear 32b mounted on the positive Z-side end thereof. The transmission shaft 33 also includes the bevel gear 34 mounted on the negative Z-side end thereof. The bevel gear 34 is engaged with the bevel gear 35. The bevel gear 35 is mounted on a shaft 122. The bevel gears 34 and 35 transmit the rotation of the transmission shaft 33 to the shaft 122.

The shaft 122 has a rotation axis AX2 parallel or substantially parallel with the X-direction and is rotated about the rotation axis AX2 by a drive force from the driver 30. The shaft 122 is rotatably supported by, for example, bearings 36a and 36b. The shaft 122 includes a gear 123a on the negative X-side end thereof, and the gear 123a is rotated about an X axis integrally with the shaft 122.

The rotor 26 includes a gear 123b on the outer circumferential surface thereof. The rotation axis of the gear 123b is identical to the rotation axis AX1 of the rotor 26. Teeth parallel or substantially parallel with the X-direction are arranged on the gear 123b along the cylindrical surface of the rotor 26. The gear 123b is engaged with the gear 123a and is rotated about the rotation axis AX1 when the gear 123a is rotated. Rotating the shaft 122 rotates the gear 123a, which then applies a rotating force to the gear 123b. This force rotates the rotor 26 about the rotation axis AX1. A shaft 26a of the rotor 26 is supported by a slide bearing 125. The inner circumferential surface of the slide bearing 125 supports the shaft 26a while receiving the radial force (the force in the radial direction) of the shaft 26a; the lower edge (the negative X-side end surface) of the slide bearing 125 supports the rotor 26 while receiving the thrust force (the force in the X-direction) of the rotor 26.

When the driver 30 drives the rotor 26 and thus the rotor 26 is rotated about the rotation axis AX1, the edge angle of a linear cutting blade Th of a cutting tool T1 mounted on the holder 25 is changed. While the driver 30 stops driving the rotor 26, the changed edge angle is maintained. As seen above, in the case of the angle adjuster 129, the rotating position of the rotor 26 is set in accordance with whether the driver 30 is driving the rotor 26, and the edge angle of the linear cutting blade Th of the cutting tool T1 mounted on the holder 25 is set on the basis of the set rotating position of the rotor 26.

As seen above, according to the second preferred embodiment, the machine tool 200 includes the driver 30 that rotates the rotor 26. Thus, it is able to automatically adjust the edge angle by causing the driver 30 to drive the rotor 26. As a result, the operator is able to adjust the edge angle without having to replace the cutting tool T1 or holder 25. That is, the operator is able to easily change the direction of the linear cutting blade Th of the cutting tool T1 in a short time.

In the second preferred embodiment, the driver 30 is able to be automatically controlled under the control of the controller CONT. Thus, for example, when the diameter, rigidity, or grasping rigidity of the workpiece W is changed with respect to the Z-direction, the edge angle (the direction of the linear cutting blade Th) is able to be automatically changed in accordance with such a change. For example, when machining a portion close to the grasping claws 9a, of the workpiece W, the operator is able to cause the machine tool 200 to machine the workpiece W in a short time, by setting the edge angle to a small angle and setting the feed speed to a high speed. On the other hand, when machining a portion distant from the grasping claws 9a, of the workpiece W (the central portion of the workpiece W in the Z-direction, etc.), the operator is able to cause the machine tool 200 to machine the workpiece W in such a manner that chattering vibration or the bending of the workpiece W is significantly reduced or prevented, and the cylindricity or surface roughness of the workpiece W is not reduced, by setting the edge angle to a large angle and setting the feed speed to a low speed. Thus, the operator is able to efficiently perform high-quality machining. Note that the edge angle may be changed in synchronization with the feed of the cutting tool T1 in the Y-direction or the rotation of the main spindle 7. Further, there may be a machine tool that includes a sensor to detect chattering vibration or the bending of the workpiece W and changes the edge angle in accordance with the detection result of the sensor.

While the preferred embodiments have been described above, the present invention is not limited thereto. Various changes can be made to the preferred embodiments without departing from the spirit and scope of the present invention.

For example, while, in the above preferred embodiments, the rotor 26 is disposed independently of the holder 25 and the holder 25 is inserted in the rotor 26, the holder 25 and rotor 26 may be disposed integrally.

Figure 7A:
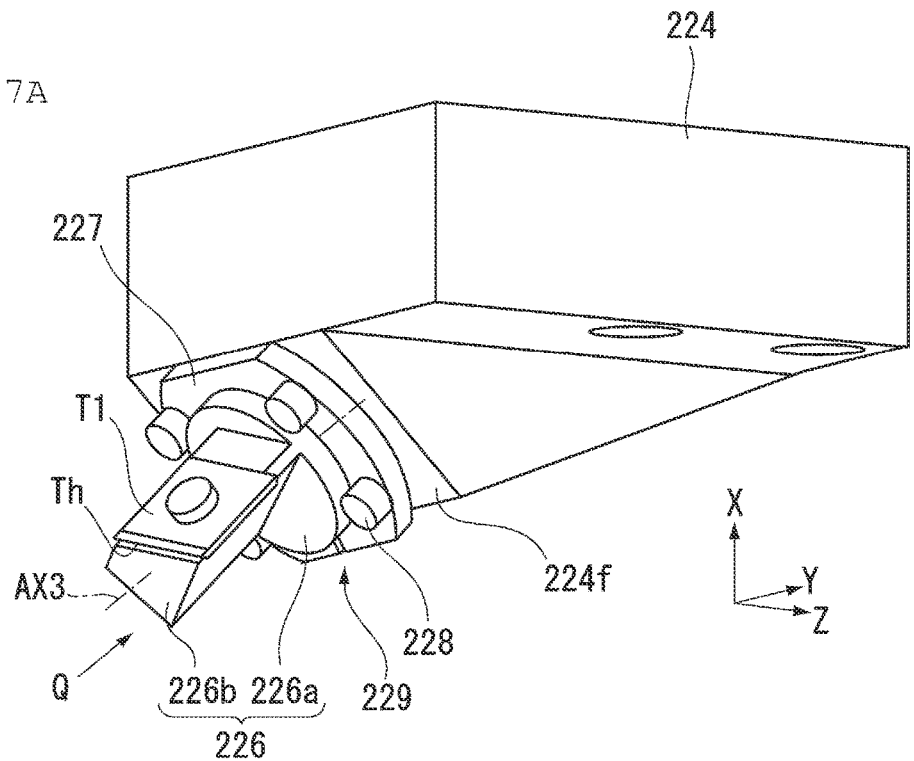
Figure 7B:
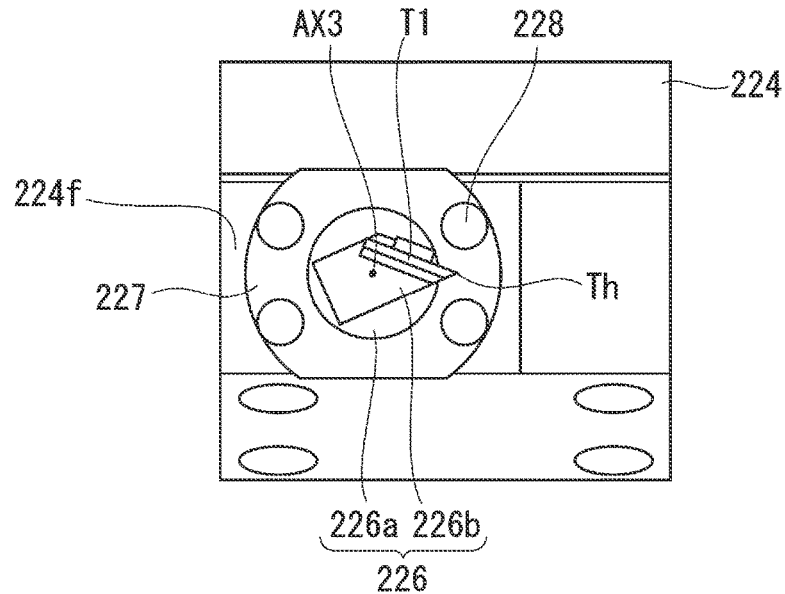
Figure 8:
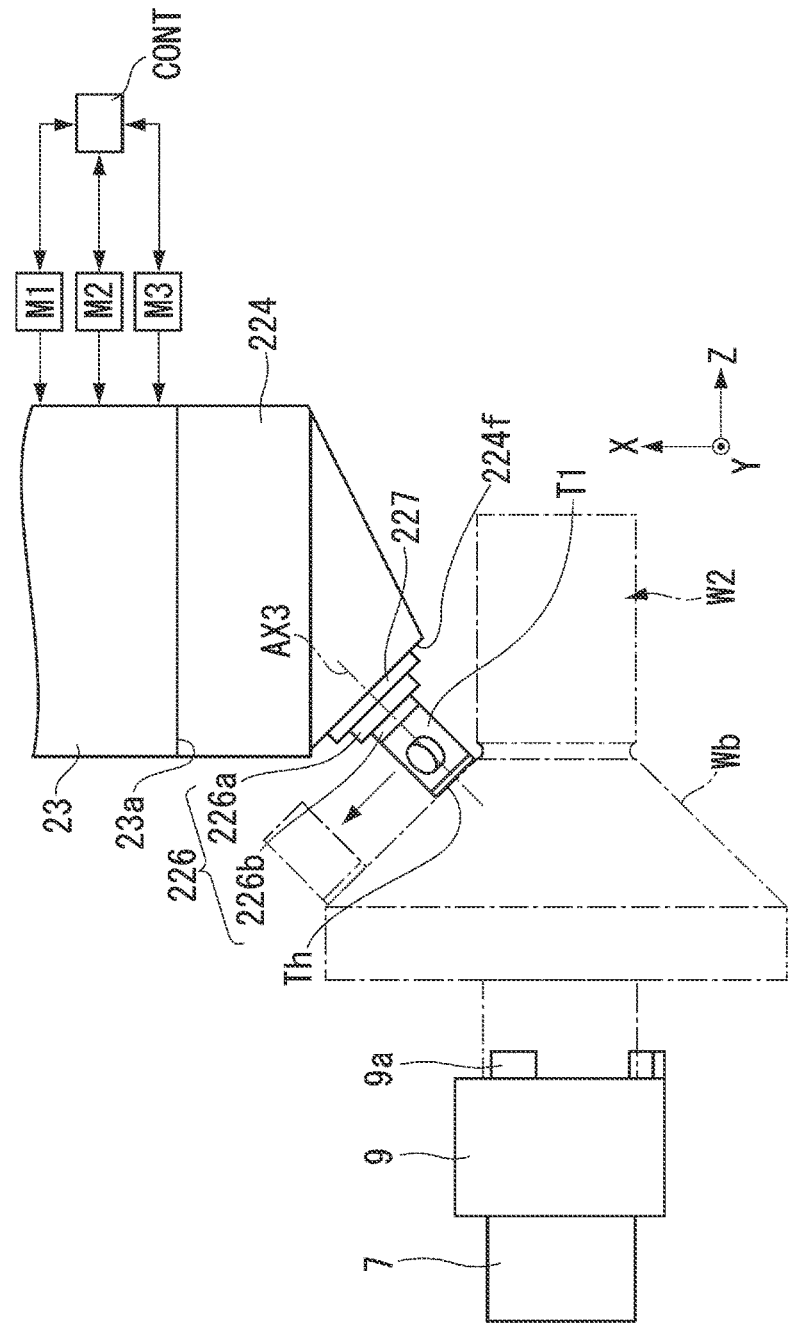
FIG. 8 is an enlarged view showing an example of a workpiece and a machine tool according to a modification of a preferred embodiment of the present invention.

While, in the above preferred embodiments, the workpiece W having the cylindrical surface Wa is cut, a workpiece W2 having an inclined surface Wb such as a tapered surface or spherical surface may be cut. FIGS. 7A and 7B include diagrams showing an example of a tool head 224 of a modification, in which FIG. 7A is a perspective view; and FIG. 7B is a diagram when seen from a direction Q in FIG. 7A. FIG. 8 is a diagram of a first turret 23 seen in the negative Y-direction.

The tool head 224 includes a tool disposition surface 224f having a cutting tool T1 disposed thereon. The tool disposition surface 224f is inclined with respect to a surface 23a (a YZ plane) of the first turret 23 and is oriented toward a main spindle 7 (see FIG. 8). The cutting tool T1 is held by the tool head 224 with a rotor 226 therebetween. The rotor 226 includes a rotating portion 226a and a holder 226b. The rotating portion 226a and holder 226b are preferably integral. The rotating portion 226a preferably has a cylindrical shape and is inserted in an opening (not shown) in the tool disposition surface 224f. The rotating portion 226a is rotatable about a rotation axis AX3. The opening preferably has a cylindrical shape and has a larger diameter than the rotating portion 226a. The rotating portion 226a is mounted over the tool disposition surface 224f with a lock sleeve 227 therebetween. The lock sleeve 227 includes a bolt 228 and a press-fit portion (not shown). The press-fit portion is press-fitted between the rotating portion 226a and opening (not shown). The press-fit portion regulates the rotation of the rotating portion 226a. By tightening the bolt 228, the rotation position of the rotating portion 226a is held by the lock sleeve 227. Also, by loosening the tightened bolt 228 and thus loosening the press-fitted lock sleeve 227, the rotor 226 can be rotated about the rotation axis AX3. The holder 226b holds the cutting tool T1. As shown in FIG. 7B, the direction of the linear cutting blade Th seen from the Q direction is inclined. Accordingly, the direction of the linear cutting blade Th seen from the X-direction is also inclined with respect to the Z-direction by a predetermined angle. In the present preferred embodiment, by rotating the rotor 226 about the rotation axis AX3 with the press-fitted lock sleeve 227 loosened, the inclination angle (edge angle) of the linear cutting blade Th is changed. As seen above, the rotor 226, lock sleeve 227, and bolt 228 define an angle adjuster 229.

As shown in FIG. 8, the tool head 224 is moved integrally with the first turret 23 in the Z- and X-directions by a Z-direction drive system M1 and an X-direction drive system M2. The tool head 224 is also moved in the Y-direction by the Y-direction drive system M3. That is, the tool head 224 is disposed so as to be movable in the Z-direction, X-direction, and Y-direction with respect to the workpiece W2 by the Z-direction drive system M1, X-direction drive system M2, and Y-direction drive system M3, respectively. As a result, the cutting tool T1 is able to move with respect to the workpiece W2 in a direction obtained by combining all or some of the Z-direction, X-direction, and Y-direction. In this case, the operator is able to cut the inclined surface Wb of the workpiece W2 by moving the linear cutting blade Th in a combined direction (moving direction) of the X-, Y-, and Z-directions while rotating the workpiece W2. The Z-direction drive system M1, X-direction drive system M2, and Y-direction drive system M3 are controlled by a controller CONT.

As seen above, even when the workpiece W2 having the inclined surface Wb such as a tapered surface or spherical surface is cut, the operator is able to easily change the inclination angle (edge angle) of the linear cutting blade Th with respect to the Z-direction when seen from the X-direction, by using the angle adjuster 229. Thus, the operator is able to easily change the direction of the linear cutting blade Th of the cutting tool T1 in a short time. While, in FIGS. 7A, 7B and 8, the rotating portion 226a is integral with the holder 226b, the rotating portion 226a and holder 226b may be independent. The configuration in which the holder 25 and rotor 26 are integral is not limited to the configuration shown in FIGS. 7A, 7B and 8 and may be applied to the above preferred embodiments of the present invention.

Figure 9A:
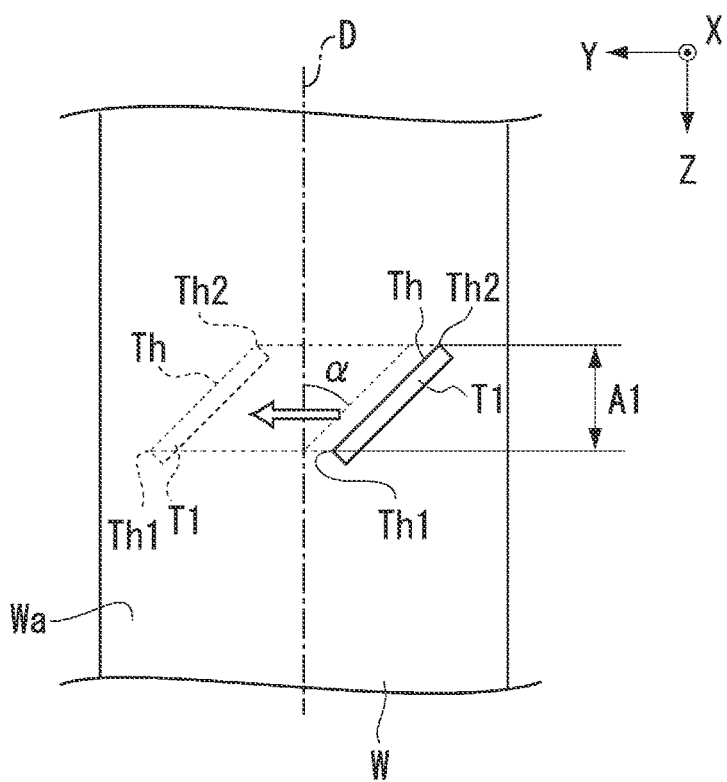
Figure 9B:
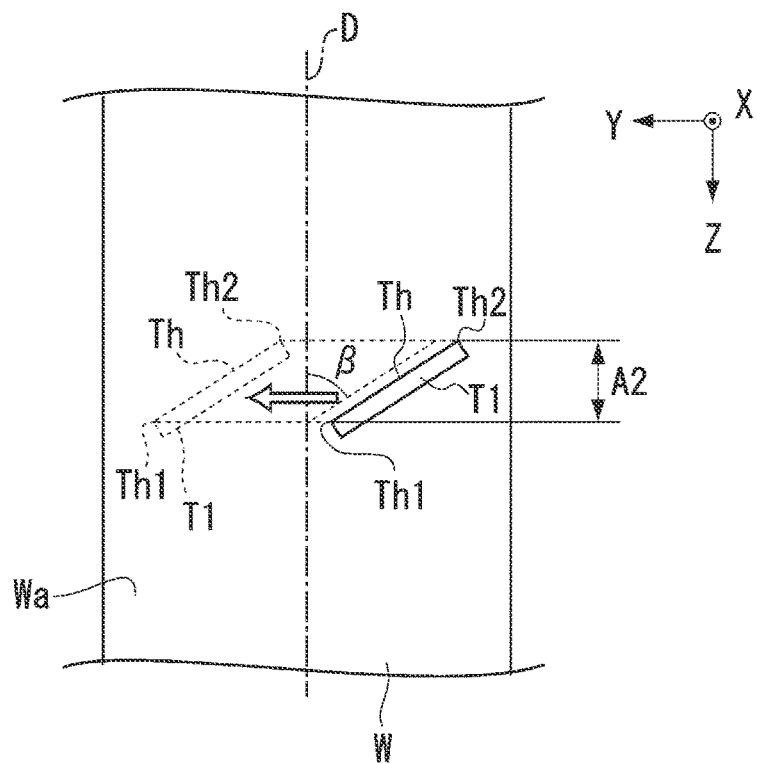

While, in the above preferred embodiments of the present invention, the cutting tool T1 is moved in a direction obtained by combining the Y- and Z-directions (e.g., in the direction P1 shown in FIG. 4), other configurations may be used. For example, the workpiece may be cut while moving the cutting tool T1 only in the Y-direction. FIGS. 9A and 9B include diagrams showing a case in which the cutting tool T1 is moved in the Y-direction, in which FIG. 9A is a diagram of a workpiece W seen from the X-direction; and FIG. 9B is a diagram of a workpiece W seen from the X-direction and shows a case in which the edge angle is different. In FIG. 9A, the edge angle is set to $\alpha$; in FIG. 9B, the edge angle is set to $\beta$.

In both FIGS. 9A and 9B, the linear cutting blade Th of the cutting tool T1 moves from the negative Y-side to the positive Y-side with respect to a generating line D along a tangent plane of the cylindrical surface Wa of the workpiece W; a positive Z-side first end Th1 of the linear cutting blade Th contacts the cylindrical surface Wa first; and when a second end Th2 of the linear cutting blade Th leaves the generating line D, the cutting of the cylindrical surface Wa is complete. The edge angle in FIG. 9A is smaller than that in FIG. 9B, and a length A1 obtained by projecting the linear cutting blade Th in FIG. 9A on the generating line D is longer than a length A2 obtained by projecting the linear cutting blade Th in FIG. 9B on the generating line D. Thus, in FIG. 9A, the workpiece is able to be cut more widely in the Z-direction with one movement in the Y-direction than in FIG. 9B. However, a larger cutting force than that in FIG. 9B is applied to the workpiece W and therefore causes chattering vibration or the like in the workpiece W. In such a case, the cutting force applied to the workpiece W is reduced by increasing the edge angle as seen in FIG. 9B.

In the above preferred embodiments, the controller CONT may automatically calculate the cutting start position and cutting end position of the cutting tool T1 and create a machining program, on the basis of information about required surface roughness, the edge angle, the diameter of the workpiece W, and the size of the workpiece W in the length direction (Z-direction). In this case, the controller CONT controls the Z-direction drive system M1, X-direction drive system M2, and Y-direction drive system M3 on the basis of the newly created machining program. The operator is able to input the various types of information to the machine tool 100 through an operation panel or the like.

The above machine tools may include a sensor to detect the direction of the linear cutting blade Th and control the edge angle of the linear cutting blade Th in accordance with an output from the sensor. The sensor may be an optical or magnetic non-contact sensor. Also, the rotor 26 need not be rotated on the basis of the above configuration and, for example, may be directly rotated by a servo motor or the like.

While, in the above preferred embodiments, the angle adjuster 29 or the like changes the edge angle of the cutting tool T1 by moving the holder 25 with respect to the tool head 24 or the like, other configurations may be used. For example, the angle adjuster may change the edge angle of the cutting tool T1 by moving the tool head 24 or the like or the first turret 23 or the like, or may change the edge angle by moving the cutting tool T1 with respect to the holder 25.

In the above preferred embodiments, the workpiece W is cut while moving the cutting tool T1 with respect to the workpiece W (the main spindle 7, etc.); instead, the workpiece W may be cut while moving the workpiece W with respect to the cutting tool T1 or while moving both the cutting tool T1 and the workpiece W.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A machine tool comprising:
   a main spindle that rotates while holding a workpiece;
   a mover that moves a cutting tool with respect to the workpiece in a moving direction including at least a Z-direction parallel or substantially parallel with an axis of the main spindle and a Y-direction perpendicular or substantially perpendicular to both the Z-direction and an X-direction, the X-direction being perpendicular or substantially perpendicular to the Z-direction and determining an amount of cutting in a radial direction of the workpiece, the cutting tool including a linear cutting blade that cuts the workpiece;
   a holder that holds the cutting tool in a state in which a direction of the linear cutting blade is parallel or substantially parallel with a YZ plane and is inclined with respect to the Z-direction by a predetermined angle when seen from the X-direction; and
   an angle adjuster that changes the predetermined angle; wherein
   the moving direction is a direction obtained by combining the Z-direction and the Y-direction.

2. The machine tool of claim 1, wherein
   the angle adjuster includes a rotor that is able to rotate about an axis parallel or substantially parallel with the X-direction; and
   the holder is mounted on the rotor.

3. The machine tool of claim 2, wherein the rotor is integral with the holder.

4. The machine tool of claim 2, further comprising a driver that rotates the rotor.

5. The machine tool of claim 2, wherein the rotor and a support that supports the rotor are provided with marks indicating the predetermined angle.

6. The machine tool of claim 1, further comprising a controller that controls movement of the mover based on information about the predetermined angle and the workpiece.

7. A method for machining a workpiece rotating while being held by a main spindle, the method comprising:
   moving a cutting tool with respect to the workpiece in a moving direction including at least a Z-direction parallel or substantially parallel with an axis of the main spindle and a Y-direction perpendicular or substantially perpendicular to both the Z-direction and an X-direction, the X-direction being perpendicular or substantially perpendicular to the Z-direction and determining an amount of cutting in a radial direction of the workpiece, the cutting tool including a linear cutting blade that cuts the workpiece;
   holding the cutting tool in a state in which a direction of the linear cutting blade is parallel or substantially parallel with a YZ plane and is inclined with respect to the Z-direction by a predetermined angle when seen from the X-direction; and
   changing the predetermined angle; wherein
   the moving direction is a direction obtained by combining the Z-direction and the Y-direction.

* * * * *